May 7, 1957     T. J. LEHANE ET AL     2,791,381
HEATING SYSTEM FOR RAILWAY CAR
Filed Sept. 12, 1951     2 Sheets-Sheet 1
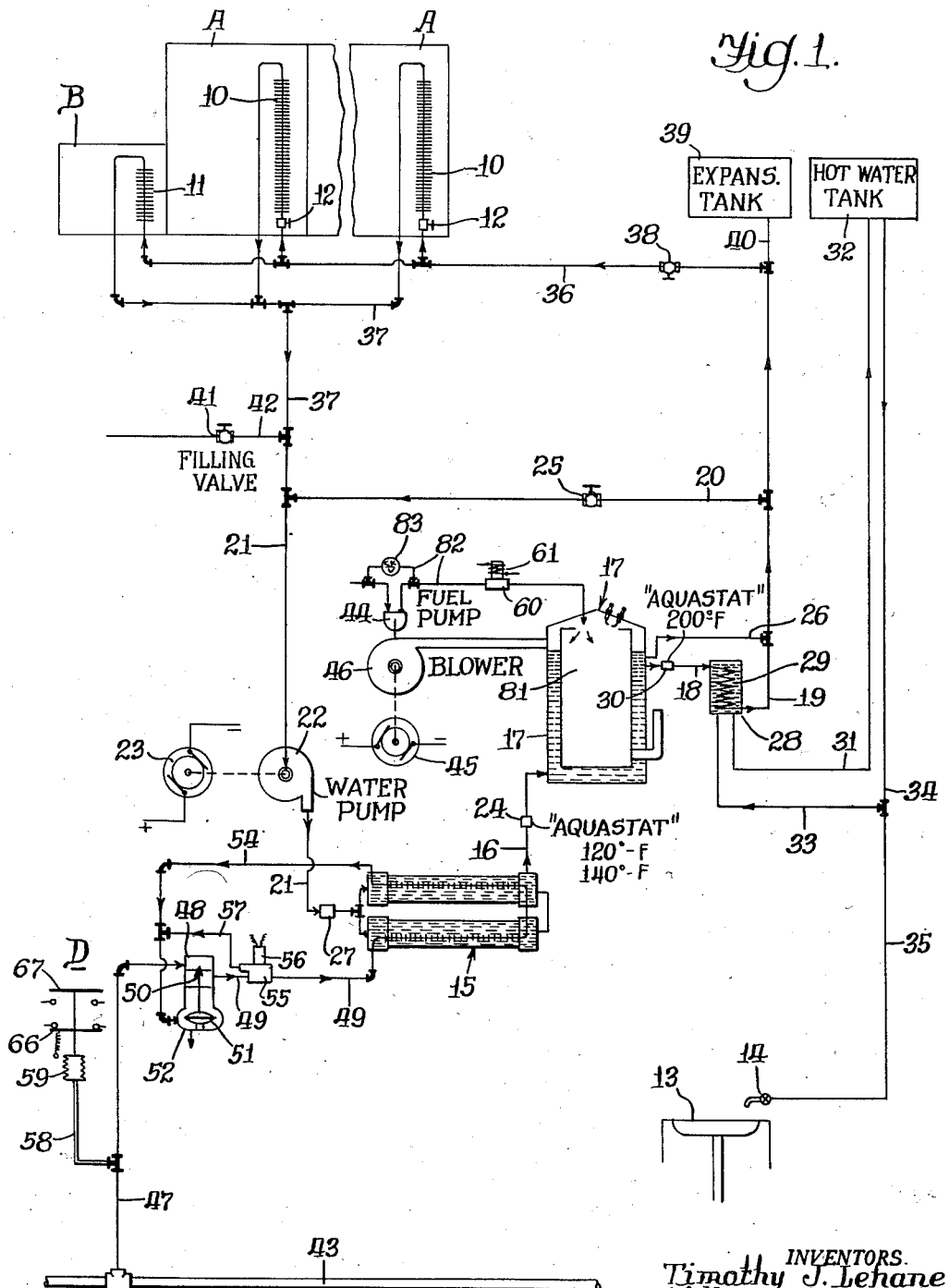
INVENTORS.
Timothy J. Lehane
William H. Smith
BY Harvey M. Gillespie
Atty.

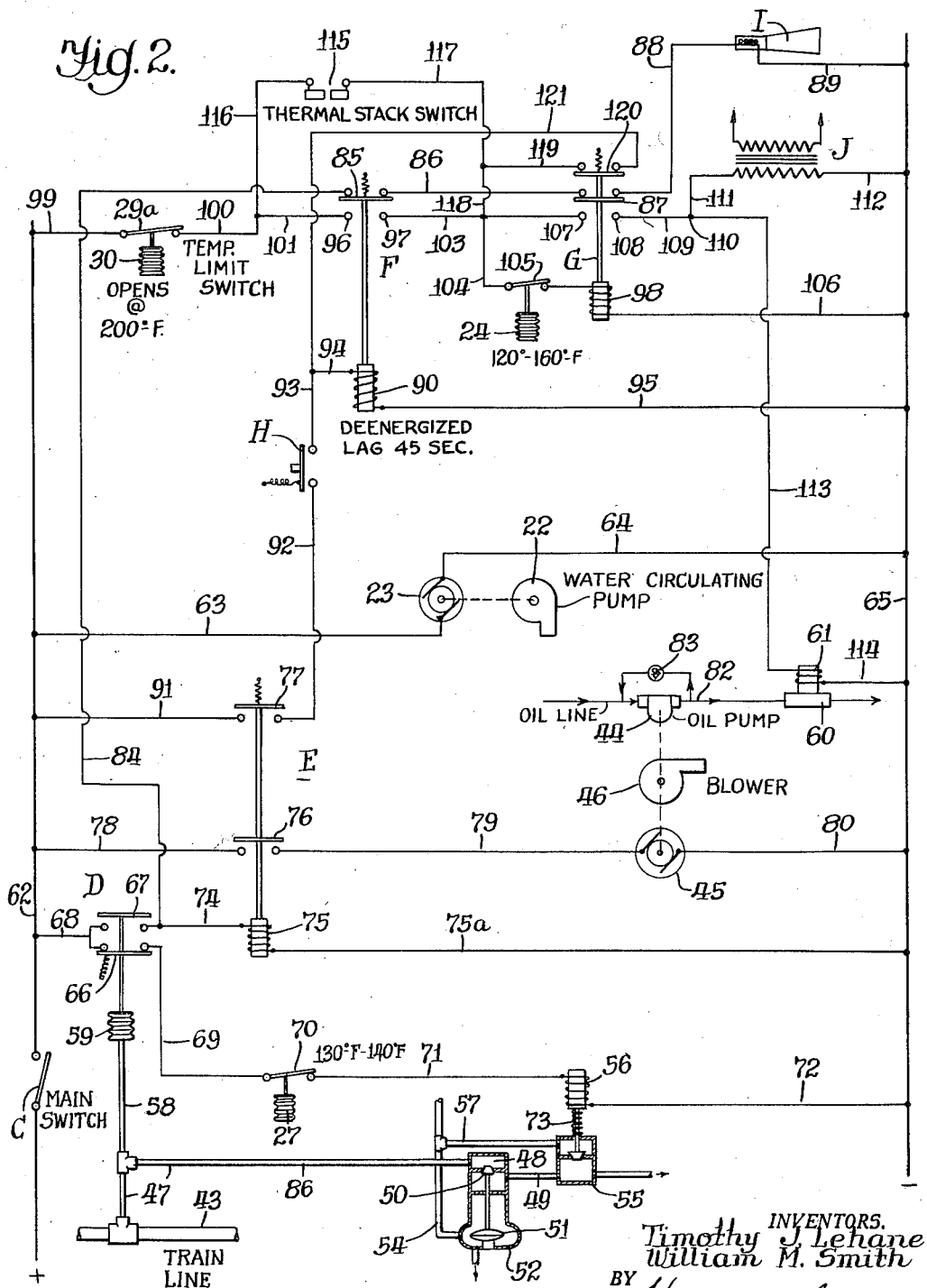

United States Patent Office 2,791,381
Patented May 7, 1957

2,791,381
HEATING SYSTEM FOR RAILWAY CAR

Timothy J. Lehane, North Riverside, and William M. Smith, Glen Ellyn, Ill., assignors to Vapor Heating Corporation, Chicago, Ill., a corporation of Delaware Application September 12, 1951, Serial No. 246,184

4 Claims. (Cl. 237—5)

This invention relates to improvements in space heating systems of the character in which a liquid is utilized as the heat carrier and is circulated through one or more radiating devices for delivering the heat by conduction, convection and radiation into the space undergoing heating.

Briefly the invention contemplates the provision of a heating system including a closed primary loop or circuit through which a circulated liquid may be heated from a plurality of heat sources, as for example a boiler and a heat exchange device such as a steam heater, both of which devices are arranged in heat exchange relationship with the liquid circulated in the primary loop or circuit. The system also includes a secondary loop or circuit having a series of heat radiating elements from which heat is delivered into the space or spaces undergoing heating. The primary loop is adapted to maintain its circulated liquid within a predetermined temperature range and to deliver the heated liquid, when required, to the secondary loop for space heating purposes.

The operation of the boiler or other liquid heating apparatus in the primary loop is automatically controlled so that the heating element or elements will function economically to heat the liquid in the primary loop within the desired temperature range, and the temperature of the liquid circulated through the secondary loop is controlled by means responsive to the temperature of the liquid returning to the heating elements of the primary heating circuit, this factor being indirectly a function of the temperature of the enclosure or enclosures undergoing heating.

The primary loop or circuit, in addition to supplying heated liquid to the secondary loop or circuit, also functions to heat an auxiliary supply of liquid, which may be wash water delivered to one or more wash basins or the like, and it so functions regardless of the particular heating means employed for heating the liquid in the primary circuit.

The provision of a heating system of the character briefly outlined above being the principal object of the invention, a further object is to provide a novel control means which is mainly electrical in its nature and which will automatically condition the auxiliary heating device or boiler for operation whenever the primary heating means or steam supply is discontinued or unavailable.

Another object of this invention is to provide electrical control means whereby, when steam is available as the primary heating means, the secondary heating means or boiler is automatically disabled or rendered incapable of use.

Another object is to provide such a system and control means therefor wherein, when steam is available as the primary heating means and the demand for heat in the primary heating loop is not sufficiently great, as evidenced by a high temperature of liquid in the primary loop, the steam is prevented from flowing to the primary heating device. Conversely, it is an object to provide a control means of this character wherein when the demand for heat in the primary loop is restored, steam will automatically be conducted to the primary heating device.

Numerous other objects and advantages of the invention, not at this time enumerated, will become more readily apparent as the nature of the invention is better understood.

In the accompanying two sheets of drawings forming a part of this specification one embodiment of the invention has been shown. In these drawings:

Fig. 1 is a schematic view of a heating system constructed in accordance with the principles of the present invention, and Fig. 1 is a wiring diagram of the electrical control circuits involved for controlling the operation of the heating system of Fig. 1. In the diagrammatic illustration of Fig. 1, the improved heating system is shown in a purely schematic manner as being installed in a railway car having a series of individual passenger compartments A, of which there may be any suitable number, and one or more wash rooms B, only one being shown for purposes of simplification. The individual compartments A are adapted to be heated by means of space heaters in the form of radiators 10 suitably located within the respective compartments and preferably adjacent the floor thereof. The wash room B is adapted to be heated by means of a similar space heater or radiator 11. The radiators 10 and 11 are arranged in parallel relationship in a closed heating circuit and constitute elements of a secondary heating loop or circuit. The individual radiators 10 may be selectively operated under the control of manually operable valves 12, while the radiator 11 is designed for continuous operation during such time as the secondary heating circuit, of which the individual radiators 10 and 11 form a part, is supplied with heating liquid which, in the present instance, may be hot water.

The wash room or compartment B may be provided with one or more wash basins 13, one being shown for the purpose of simplicity, and each basin is provided with a manually operable, valve controlled hot water tap 14. The basin or basins 13 may however be located within the railway car at points remote from the washroom B.

The heating system includes a primary heating loop or circuit having a high temperature or delivery side and a return side. This primary loop or circuit includes a steam heat exchanger 15 which, when in operation, delivers heated water through a conduit 16 to the inlet side of an automatically operable boiler 17. A series of return conduit sections 18, 19, 20 and 21 constitutes the return side of the loop and extends from the outlet side of the boiler 17 to the inlet side of the steam heat exchanger 15.

The conduit section 21 has interposed therein a continuously operable circulating water pump 22 adapted to be driven by means of a pump motor 23. The conduit section 16 has interposed therein an Aquastat 24, which may have a range of from 120° F. to 140° F., and the conduit section 20 has interposed therein a gate valve 25. The water pump 22 is preferably of the centrifugal type and is adapted to permit thermally induced circulation of water through the circuit just described when the pump is inoperative. An air vent 26 is disposed in the conduit section 19. An Aquastat 27 is interposed in the line 21 for the purpose of cutting off the supply of steam to the heat exchanger 15 when a predetermined temperature of the water in the return conduit section 21 leading to the inlet side of the heat exchanger 15 is attained.

A water-to-water heat exchanger 28 is provided with a heating coil 29 connected by means of a conduit 18 to the outlet side of the boiler 17, and an Aquastat 30 which functions as a temperature limit switch, the contacts of which may be caused to open at 200° F., is disposed in the conduit between the boiler and heat exchanger. The cold or heated side of the heat exchanger 28 is connected by a conduit section 31 to the inlet of a hot water tank 32, and is also connected by conduit sections 33 and 34 to the outlet of the tank. A conduit section 35 extends from the juncture between the sections 33 and 34 to the hot water tap 14 of the wash basin 13.

The previously mentioned secondary heating loop or circuit includes a manifold line consisting of conduit sections 36 leading to the various radiators 10 and the wash room radiator 11 and a manifold return line consisting of conduit sections 37. The line 36 has a master valve 38 disposed therein so that circulation of liquid through the secondary loop may be controlled. Also the radiators 10—10 are provided with manual control valves 12—12. An expansion tank 39 is connected through a conduit section 40 to the conduit sections 19 and 36. A filling valve 41 serves to supply water from a suitable source (not shown) to the system through a conduit section 42 feeding into the conduit section 37.

From the above description it will be seen that the water in the primary loop or circuit may be heated either by means of the steam heat exchanger 15 or by means of the boiler 17. Where steam is available from the train steam line 43, the heat exchanger 15 will ordinarily be employed for heating the liquid in the primary loop or circuit, but when such a source of steam is not available, as for example when the railway car is uncoupled from a source of steam, the boiler 17 may be fired from a suitable fuel oil supply source (not shown) leading to a fuel oil pump 44, operable under the control of a motor 45 which also serves to drive the air blower 46 of the boiler 17.

Steam for the heat exchanger 15 is supplied through a conduit section 47 leading to an automatic pressure reducing valve structure designated as a whole by the reference character 48 and having a connection 49 leading to the steam heat exchanger 15. For purposes of economy, the steam pressure within the heater 15 is maintained at substantially atmospheric pressure and, toward this end, the pressure reducing valve 48 is thermostatically controlled in relation to the temperature at the steam discharge end of the heat exchanger 15. Accordingly, the valve element 50 of the reducing valve is adapted to be actuated by means of a temperature responsive element 51 disposed within a thermostat chamber 52 which is connected through a conduit section 54 to the steam discharge end of the heat exchanger 15. When steam is delivered to the heat exchanger 15 in an amount greater than is capable of being condensed therein, the surplus steam is discharged through the conduit section 54 to the chamber 52, thus expanding the thermal element 51 and closing the valve element 50 of said pressure reducing valve structure until such time as the steam in exchanger 15 has been fully dissipated. A normally open solenoid-actuated valve 55 is disposed in the conduit section 49 and is operable upon energization of its control solenoid 56 to become opened. The valve 55 constitutes a by-pass valve for shutting off the delivery of steam from the pressure reducing valve structure 48 to the heat exchanger 15. Accordingly a by-pass conduit 57 connects the valve 55 to the conduit section 54.

The conduit section 47 leading from the steam line 43 to the pressure reducing valve structure 48 communicates with a pressure line 58 leading to a control bellows 59 or the like associated with a steam pressure switch D which serves in a manner that will be made clear presently to automatically disable the motor 45 which controls the various boiler operating instrumentalities including the fuel oil pump 44 and blower 46.

The boiler 17 depends for its operation upon the previously mentioned fuel oil pump 44 and blower 46, as well as upon a fuel supply valve 60 which is operable under the control of a solenoid 61, the operation of which will be made clear when the electrical controls of the present invention, as illustrated in Fig. 2, are set forth.

Referring now to Fig. 2 wherein the electrical control instrumentalities for controlling the operation of the heating system have been diagrammatically illustrated, closure of a main switch C makes current available to the motor 23 of the water circulating pump 22 by automatically establishing this circuit. The circuit leads from closed main switch C through positive line 62, lead 63, through the motor 23 and lead 64 to the negative line 65. Thus closure of the switch C sets the water circulating pump 22 into operation, which operation continues throughout the entire operation of the system.

When the steam train line 43 contains a full head of steam pressure, as for example when the railway car is coupled in a train or is connected to any other source of steam, a normally open contact 66 of the pressure switch D will become closed and the normally closed contacts 67 thereof will become open under the influence of the expanding bellows 59 so that a circuit through the contact 70 of the Aquastat 27 potentially exists. If the return water in the conduit section 21 is at or below a predetermined minimum temperature, which may be 120° F., the contact 70 of Aquastat 27 will be closed so that the solenoid 56 of the normally open by-pass valve 55 will be energized and steam may flow through the pressure reducing valve structure 48 to the heat exchanger 15. The energizing circuit for solenoid 56 leads from positive line 62 through lead 68, closed contact 66 of pressure switch D, lead 69, closed contact 70 of Aquastat 27, lead 71, solenoid 56 and lead 72 to the negative line 65. Conversely, if the return water in conduit section 21 attains a predetermined maximum temperature of 140° F., the contact 70 of Aquastat 27 will open and thereby de-energize solenoid 56, whereupon the valve 55 will open, by pressure of spring 73 and thereby direct steam through the by-pass conduit 57 and steam discharge conduit 54 through the thermostat chamber 52 so as to expand the thermal element 51 and close valve 50.

When the steam train line 43 is disconnected from a source of steam, the normally closed contact 67 of the pressure switch D will close and a circuit will exist for energizing a relay E. This circuit leads from positive line 62 through lead 68, normally closed contact 67 of pressure switch D, lead 74, solenoid 75 of relay E, and thence through lead 75a to the negative line 65. Energization of the relay E will cause closure of its contacts 76 and 77. Closure of the contact 76 of said relay E will energize a circuit through the motor 45 of the air blower 46 and fuel pump 44. This circuit leads from positive line 62 through lead 78, energized closed contact 76 of relay E, lead 79, motor 45, and thence through lead 80 to the negative line 65. The energization of motor 45 sets the blower 46 into operation to deliver combustion air into the combustion chamber 81 of the boiler 17 and also establishes pressure in the fuel delivery line 82 to the fuel valve 60. The fuel is by-passed from the pressure side of pump 44 through check valve 83 until the fuel valve 60 is opened. Closure of the contact 77 of the relay E serves to potentially energize a circuit leading through an actuating solenoid of an outfire relay F which, in turn, cooperates with a pilot relay G for controlling the fuel valve 60 and the firing circuit for the boiler 17, but actual firing of the boiler cannot be accomplished until depression of a start button H closes its contacts.

In order that the attendant may be apprised of the fact that the steam line has been disconnected or that the boiler 17 for any other reason is not functioning properly, initial closure of the contact 67 of the pressure switch D establishes an alarm circuit through a horn I or similar annunciator or alarm device. This circuit leads through the closed contact 67 of the pressure switch D, through lead 84, de-energized closed contact 85 of the outfire relay F, lead 86, de-energized closed contact 87 of the pilot relay G, signal element I and thence through lead 89 to the negative line 65.

When there is no steam available, the contact 67 of pressure switch D is closed. Consequently, closing of start button H serves to momentarily close an energizing circuit through actuating solenoid 90 of outfire relay F. This circuit leads from positive line 62 through lead 91, energized closed contact 77 of relay E, lead 92, start button H, leads 93, 94, solenoid 90 of outfire relay F, and thence through lead 95 to negative line 65. Energization of relay F immediately opens its contact 85 to de-energize the signal I. Energization of the outfire relay F also causes closing of the normally open contacts 96, 97 of switch F so that a circuit exists through the control solenoid 98 of pilot relay G. This circuit extends from the positive line 62 through lead 99, closed contact 29a of Aquastat 30, leads 100, 101, relay contacts 96, 85, 97, leads 103, 104, contact 105 of Aquastat 24, actuating solenoid 98 of pilot relay G, thence through lead 106 to negative line 65.

Energization of the pilot relay G serve to move its contact 87 into engagement with its contacts 107, 108. Closure of the latter contacts serves to energize the solenoid winding 61 of the fuel supply valve 60 as well as to energize the primary winding of the transformer J, the secondary winding of which supplies current for firing the boiler 17. This circuit exists from the positive line through lead 99, contact 29a of Aquastat 30, leads 100, 101, contacts 96, 85, 97, of outfire relay F, lead 103, contacts 107, 87, 108 of pilot relay G, lead 109, to junction 110. From this junction one branch extends through lead 111, primary winding of transformer J and lead 112 to the negative line 65. Another branch extends from said junction 110 through lead 113 to the winding 61 of fuel valve 60 and thence through lead 114 to the negative line 65.

Since closure of the contacts of the starting button H is of momentary duration, the outfire relay F remains energized for a short period of time (45 seconds) after the start button circuit is opened. Inasmuch as the energization of pilot relay G is initially under the control of the energized outfire relay F, a holding circuit for pilot relay G is made effective within the period of (45 seconds) that the outfire relay F remains energized. If the boiler fires during this length of time, stack switch 115 closes and thereby establishes a holding circuit through solenoid 98 of pilot relay G. This holding circuit extends from positive line 62 through lead 99, closed contact 29a of Aquastat 30, leads 100, 116, stack switch 115, leads 117, 118, 104, closed contact 105 of Aquastat 24, solenoid 98 of pilot relay G, and thence through lead 106 to negative line 65. Consequently the de-energization of outfire relay F at the end of 45 seconds is not effective to de-energize the presently energized relay G. If the boiler fails to fire upon initial depression of the start button H, the temperature of the stack switch 115 will not rise to a degree sufficient to close its contacts and the pilot relay G will therefore become de-energized simultaneously with the de-energization of outfire relay F, thus closing contact 87 of said relay G to complete a circuit through the signal I.

If the heat demand is small, the Aquastat 24 in the conduit section 16, which returns water to the boiler 17, will attain its predetermined maximum temperature, for example 140° F. The contacts of said Aquastat will become open thus de-energizing the pilot relay G and closing its contact 87 to momentarily re-establish a circuit through signal I. Such closure of the signal circuit will be of extremely short duration, however, inasmuch as de-energization of the pilot relay G, while the stack switch 115 is closed, establishes an energizing circuit through solenoid 90 of outfire relay F. This circuit extends from positive line 62 through lead 99, contact 29a of Aquastat 30, leads 100, 116, stack switch 115, leads 117, 119, de-energized closed contact 120 of relay G, leads 121 and 94, through solenoid 90 of relay F, and lead 95 to the negative line 65. Energization of relay F immediately opens the signal circuit and moves its contact 85 into a position to bridge the associated contacts 96, 97. When the contact 105 of the Aquastat 24 again becomes closed due to a decline in the water temperature, the various boiler control circuits, previously described, will become established and the boiler will fire automatically.

If the temperature of the water in the vicinity of Aquastat 30 in the conduit section 18 rises to the arbitrary setting of 200° F., the contact 29a of the Aquastat 30 will become open, thus opening, as previously described, the holding circuit for the pilot relay G and all other associated circuits which serve to maintain the boiler in operation. At the same time the signal circuit becomes re-established and, even if the water temperature drops sufficiently to cause the contact 29a of Aquastat 30 to become closed, it will be necessary for the attendant to depress the start button H to again fire the boiler 17 in the manner previously described.

From the above description it will be seen that there has been provided an improved heating system in which water or other heated liquid is circulated, or is available for circulation, through the heating elements 10 and 11 for heating the spaces provided by the various compartments A and the compartment B, while at the same time the liquid is circulated through the water-to-water heat exchange device 28 so that water is at all times available in a heated condition for supply to the wash basin or basins 13 on demand. The mere application of steam to, or the presence of steam in, the steam train line 43 will serve to disable the boiler 17 while at the same time allowing steam to flow to the heat exchanger 15 under the control of the Aquastat 27, providing the temperature of the water in the return line leading to the heat exchanger is below a predetermined maximum. If the temperature of the water in the return line is above the predetermined maximum, the supply of steam to the heat exchanger will be automatically cut off. If no steam is available at the steam train line, operations will take place whereby the boiler 17 is conditioned for immediate operation upon depression of the start button H, a suitable audible alarm being effective to notify the attendant that boiler operation is in order. The alarm is repetitive in the event of boiler failure or failure to fire upon initial depression of the start button. If the heat demand is small while the boiler is in operation, the Aquastat 24, operating within its predetermined limits, will effect periodic disabling of the boiler until the demand again becomes appreciable. Finally, if the temperature of water leaving the boiler 17 exceeds a predetermined maximum as evidenced by opening of the contact 29a of the Aquastat 30 in the hot water line 18, all of the boiler instrumentalities are disabled and can be set into operation again only by manual initiation of the boiler firing operation on the part of the attendant.

We claim:

1. In a space heating system of the character described comprising, in combination, piping defining a primary liquid circuit including delivery and return ends thereof, a pair of selectively operable heat sources provided with separate liquid sections connected in series relation and interposed in the piping of the primary liquid circuit between the delivery and return ends thereof, one of said heat sources comprising a steam heated element for heating the liquid in one of said liquid section and the other the source comprising an oil burner for heating the liquid in the other liquid section, piping defining a secondary liquid circuit for delivering heat into the space being heated and having an inlet end communicating with the delivery end of the primary liquid circuit and a discharge end communicating with the return end of said primary liquid circuit, pump means for forcibly circulating liquid through said primary and secondary circuits, a source of steam supply for said steam heated element, temperature responsive means for controlling the delivery of steam from said source of steam supply to said steam heated element, an electrical control system for controlling the operation of said oil burner including a switch interposed therein and normally effective to permit controlled activation of said oil burner, and fluid pressure means associated with said switch and responsive to steam pressure in said source of steam supply for moving the switch to a position to render said control system ineffective to activate said oil burner.

2. A space heating system as defined in claim 1 characterized in that the electrical control system for the oil burner includes a temperature actuated electrical switch device responsive to a predetermined temperature of the liquid in the system intermediate said liquid sections to disable said oil burner and responsive to a predetermined lower temperature of the liquid at the same location to reactivate said oil burner.

3. A space heating system as defined in claim 1 characterized in that the electrical control system for controlling said oil burner includes an electrically energized switch which is momentarily energized by the initial energization of the system to maintain the system effective for a limited period only and further characterized by the provision of temperature sensitive switch responsive to the temperature generated by the firing of the oil burner to maintain said control system energized after the expiration of said limited period.

4. A space heating system as defined in claim 1 characterized in that the temperature responsive means for controlling the delivery of steam to said steam heated element includes an electrically energized valve and circuitry therefor and a switch device responsive to a predetermined temperature of the liquid in the return end of said primary liquid circuit for interrupting the delivery of steam to said steam heated element.

References Cited in the file of this patent
UNITED STATES PATENTS

| | | |
|---|---|---|
| 477,464 | Sewall | June 21, 1892 |
| 1,240,101 | Thompson | Sept. 11, 1917 |
| 1,531,509 | Russell | Mar. 31, 1925 |
| 1,590,581 | Irle | June 29, 1926 |
| 2,020,064 | Kehm | Nov. 5, 1935 |
| 2,065,285 | Miller | Dec. 22, 1936 |
| 2,235,692 | Timmis | Mar. 18, 1941 |
| 2,240,731 | Van Vulpen | May 6, 1941 |
| 2,296,325 | Bak | Sept. 22, 1942 |
| 2,332,149 | Horton | Oct. 19, 1943 |
| 2,480,883 | Schramm | Sept. 6, 1949 |
| 2,520,446 | Thrush | Aug. 29, 1950 |
| 2,635,813 | Schlenz | Apr. 21, 1953 |